United States Patent
Rohner (10) Patent No.: US 12,081,094 B2
(45) Date of Patent: Sep. 3, 2024

(54) DRIVE DEVICE HAVING A TUBULAR LINEAR MOTOR

(71) Applicant: NTI AG, Spreitenbach (CH)

(72) Inventor: Ronald Rohner, Widen (CH)

(73) Assignee: NTI AG, Spreitenbach (CH)

( * ) Notice: Subject to any disclaimer, the term of this patent is extended or adjusted under 35 U.S.C. 154(b) by 820 days.

(21) Appl. No.: 17/001,655

(22) Filed: Aug. 24, 2020

(65) Prior Publication Data

US 2021/0066990 A1  Mar. 4, 2021

(30) Foreign Application Priority Data

Aug. 26, 2019  (EP) .................................. 19193649

(51) Int. Cl.
*H02K 5/16* (2006.01)
*F16C 19/14* (2006.01)
*H02K 5/173* (2006.01)

(52) U.S. Cl.
CPC ............. *H02K 5/173* (2013.01); *F16C 19/14* (2013.01); *F16C 2202/40* (2013.01); *F16C 2208/36* (2013.01); *F16C 2208/52* (2013.01)

(58) Field of Classification Search
CPC ........ H02K 5/173; H02K 41/02; F16C 19/14; F16C 2202/40; F16C 2208/36; F16C 2208/52
USPC ......................................................... 310/90
See application file for complete search history.

(56) References Cited

U.S. PATENT DOCUMENTS

| | | | | |
|---|---|---|---|---|
| 3,149,255 A | * | 9/1964 | Trench | H02K 33/06 335/266 |
| 5,955,798 A | | 9/1999 | Ishiyama et al. | |
| 7,847,442 B2 | * | 12/2010 | Rohner | H02K 11/20 310/34 |

(Continued)

FOREIGN PATENT DOCUMENTS

| | | | | |
|---|---|---|---|---|
| CN | 104 022 616 B | | 6/2016 | |
| DE | 102010050600 A1 | * | 5/2012 | ............ F16C 19/166 |

(Continued)

OTHER PUBLICATIONS

Machine translation of DE102010050600;Meier et al.; (Year: 2012).*

(Continued)

*Primary Examiner* — Terrance L Kenerly
(74) *Attorney, Agent, or Firm* — Kilpatrick Townsend & Stockton LLP (57) ABSTRACT

A drive device comprises at least one tubular linear motor (M1; M1'; M2) which has a cylindrical armature (20; 120) and a tubular stator (10) with a cylindrical magnetic yoke (11) and a through-hole (13) coaxial with the magnetic yoke (11). Electric drive coils (12; 112) are arranged in the magnetic yoke (11). The armature (20; 120) has a non-magnetic armature tube (21) in which permanent magnets (23) are arranged. The armature (20; 120) extends coaxially through the through-hole (13) and is mounted so as to be movable in its longitudinal direction relative to the stator (10). The drive device comprises linear ball bearings (15; 115), and the armature (20; 120) of the tubular linear motor (M1; M1'; M2) is mounted in the linear ball bearings (15; 115).

17 Claims, 10 Drawing Sheets

(56) References Cited

U.S. PATENT DOCUMENTS

| | | | |
|---|---|---|---|
| 8,362,720 B2* | 1/2013 | Aso | H02K 11/215 |
| | | | 318/135 |
| 9,071,122 B2* | 6/2015 | Neufeld | H02K 11/21 |
| 2002/0064326 A1 | 5/2002 | Tanaka | |
| 2006/0168745 A1* | 8/2006 | Kobayashi | A61C 17/3445 |
| | | | 15/22.1 |
| 2015/0184695 A1* | 7/2015 | Schulte-Noelle | F16C 33/32 |
| | | | 148/318 |
| 2017/0229945 A1* | 8/2017 | Harnsberger | H02K 1/34 |

FOREIGN PATENT DOCUMENTS

| | | | | |
|---|---|---|---|---|
| EP | 1 607 205 A1 | 12/2005 | | |
| EP | 2052968 A2 * | 4/2009 | | B64C 27/08 |
| JP | 3738556 B2 * | 1/2006 | | F16C 19/52 |
| WO | 2007/113670 A2 | 10/2007 | | |

OTHER PUBLICATIONS

Extended European Search Report, dated Jun. 24, 2020, for corresponding European application No. 19193649.1, 11 pages.

Hussain, Hussain A. et al., "Field Oriented Control of Tubular PM Linear Motor using Linear Hall Effect Sensors," 2016 International Symposium on Power Electronics, Electrical Drives, Automation and Motion (Speedam), Jun. 22, 2016, pp. 1244-1248, IEEE, Anacapri.

Partial European Search Report, dated Dec. 23, 2020, for related European application No. 20192612.8, 14 pages.

* cited by examiner

DRIVE DEVICE HAVING A TUBULAR LINEAR MOTOR

This application claims priority to European Patent Application No. EP 19193649.1, filed Aug. 26, 2019, the disclosure of which is incorporated by reference herein.

The present invention relates to a drive device having at least one tubular linear motor in accordance with the independent claim.

Linear motors are to be understood hereinbelow as being electric drives in which the linear movement is generated directly from electromagnetic force generation without the use of mechanical drive components. Linear motors have been known since the beginning of electric drive technology. The breakthrough of linear motors in the industrial sector as linear servo motors took place with the economical availability of fast power electronics and microprocessor technology. In parallel therewith, linear motors also developed in sectors such as railway technology as what are known as long stator motors.

Linear motors have hitherto been most widespread in the field of handling technology and general mechanical engineering, packaging technology, food processing or special-purpose machine manufacturing. Two types of construction are mainly used, namely what are known as the flat linear motor and the tubular linear motor. In figurative terms, the flat linear motor can be imagined as being a rotative electric motor that has been cut open and laid flat. The latter comprises, as is known, a stator and a rotor. Accordingly, a flat linear motor likewise comprises a stator and a rotor, but the latter is more appropriately referred to as an armature (since it does not rotate). In principle, it is immaterial hereinbelow whether the stator or the armature is moved. For the sake of simplicity the stator is always understood as being that part of the linear motor in which the electric drive coils are arranged. In the case of a permanent-magnet-excited linear motor the armature is understood as being that part of the motor in which the permanent magnets are housed. A tubular linear motor comprises a tubular stator having a cylindrical magnetic yoke and a through-hole coaxial with the magnetic yoke, and also an armature having a non-magnetic armature tube in which the permanent magnets are arranged. The armature extends coaxially through the through-hole and is movable relative to the stator in that through-hole coaxially with the stator.

In principle it is in this way possible for all types of electric motors to be realised in the form of flat or tubular linear motors. In the case of linear motors as in the case of rotative servo motors, however, permanent-magnet-excited synchronous motors have become established in the industrial sector on account of the dynamics, control quality and power density that are required.

While the permanent magnets, sensor technology and electronics used for flat and tubular linear motors are largely identical, there is a significant difference between the two forms of linear motor in respect of the bearing arrangement of the moving part of the motor.

In the case of a flat linear motor, the permanent magnets are customarily arranged along a track on a long base plate, over which a carriage moves, which carriage is guided on the base plate to the right and left of the track. The drive coils and a yoke made of iron are arranged on this carriage. The magnetic circuit is thus closed in the optimum way, and the greatest possible magnetic field develops in the region of the drive coils. However, as a result of the iron yoke (for example a yoke plate) a large vertical attraction force towards the permanent magnets on the base plate develops.

From the viewpoint of motor technology it is important that the distance between the permanent magnets and the drive coils with the adjoining iron yoke be kept as small as possible in order to achieve the highest possible power density. However, the attraction force is inversely proportional to the square of the distance between the permanent magnets and the iron yoke (the smaller the distance, the greater the attraction force). Although, in principle, it is possible to dispense with the iron yoke, the output of the motor is then reduced in a double-digit percentage range. As a logical consequence of the strong magnetic attraction forces, the carriage with the coils and the yoke must therefore be very stably guided. In most cases there are used for that purpose what are known as profile rail guides in which a guide carriage having rolling elements (balls or rollers) runs on high-precision guide rails. The rails themselves are arranged to the right and left of the permanent magnets. In applications such as in machine tools (milling machines, grinding machines etc.), for which the process movements must be performed in a highly precise and robust way, such bearing arrangements must be provided in any case, so that the cost outlay and the structural size of the profile rails are not a factor. In the case of general tasks, such as, for example, a simple sliding movement or a pick-and-place application, the bearings must in most cases be designed for the load exerted by that magnetic attraction and not, for example, for the requirements of the application. Accordingly, the high costs and the large structural size of the bearing arrangement, which is overdimensioned from the viewpoint of the application, have to be considered a negative aspect.

A different situation arises in the case of a tubular linear motor. As a result of the rotationally symmetrical design it can readily be understood that the attraction forces of the permanent magnets, which are arranged along the axis of symmetry (longitudinal axis), ideally counterbalance one another in the rotationally symmetrical iron yoke of the stator. That is to say, assuming that all permanent magnets have the same homogeneous force distribution and all mechanical tolerances are equal to zero, in the case of a vertically arranged motor the armature would "float" exactly in the centre. In practice, of course, such a case never occurs, for which reason the armature has to be guided either inside or outside the stator in a bearing. What fundamentally differentiates the tubular linear motor from the flat linear motor, however, is that the load exerted on the bearings by the magnetic attraction forces is very low. When the armature is mounted centrally (coaxially), those magnetic attraction forces arise solely as a result of the magnetic and mechanical tolerances. In industrial applications, linear plain bearings have become established for mounting the armature in the case of tubular linear motors, which bearings are mounted either outside the stator or inside the stator under the drive coils. The plastics plain bearings customarily used as linear plain bearings are not attracted by the permanent magnets in the armature and form a suitable sliding partner for the armature tubes, which are typically made from stainless steel. In principle it would also be possible to use magnetic bearings, air bearings or hydrostatic bearings for guiding the armature, but such forms of bearing have hitherto been regarded as too expensive for normal industrial applications.

In principle, in addition to the reasons already given, the use of plain bearings for tubular linear motors is entirely appropriate, since only plain bearings are able to cope with the huge accelerations of up to 300 m/s$^2$ that frequently occur. Bearings based on rolling elements, such as, for example, balls, cannot be used for such accelerations. The reason lies in the fact that when accelerations are too great the balls begin to slide and no longer roll. As a result, such a bearing can very quickly be destroyed.

The use of a plain bearing, however, requires, due to principle involved, a radial play between the bearing and the armature. As a result of the technical implementation of the armature as a stainless steel tube in which the permanent magnets and optionally also spacers between the permanent magnets are arranged, the play selected must be considerably greater than if the armature were a ground high-precision shaft, it being necessary to bear in mind that even the raw material in the form of a very thin-walled tube is on no account comparable to a ground shaft in respect of roundness and straightness (in the longitudinal direction). The introduction of the permanent magnets and the spacers also has the result that additional bulge points can be formed on the surface of the armature. In addition, a lateral load on the armature, as occurs in most applications, causes bending of the armature. In respect of the bending stress, or bending, it should be borne in mind that only the thin-walled stainless steel tube is able to apply a counter-moment. The column of individual permanent magnets and iron discs (spacers) in the interior of the armature is not robust in that respect. The bending of the armature and the play due to the principle involved can accordingly quickly result in the armature's becoming wedged in the plain bearings. The consequence of this is higher friction and wear to the bearings, and it may even result in a complete blocking of the linear movement. In order to counteract this, the play selected must be relatively large, that is to say the armatures of a tubular linear motor are allowed to be subject to only slight loading laterally.

Apart from the fact that, depending upon the field of use of the linear motor, such a large radial play cannot be accepted, a large radial bearing play has an adverse effect on the tubular linear motor in two respects: firstly, as a result of the position of the armature outside the centre (the longitudinal axis) an increasing magnetic attraction force develops, because the radial components of the magnetic attraction forces no longer counterbalance one another. A radial play in the range of a few tenths of a millimetre can already give rise to considerable attraction forces which place a heavy load on the bearings, because the wear to a linear plain bearing is at a first approximation proportional to the product of speed and surface pressure. In addition, the radial positional displacement affects the internal position sensor system employed in the linear motor. For such a position sensor system it is customary to use Hall sensors which measure the field of the permanent magnets in the armature. If the radial distance between the Hall sensors and the permanent magnets changes, corresponding differences in the measurement signal will occur which result in errors in the determination of the position of the linear motor. It will be readily understood that during a dynamic movement of the armature or generally in the event of changes in the load on the armature, its position in relation to the centre (the longitudinal axis) constantly changes in an unpredictable way as a result of the radial play and therefore measurement errors will occur. When Hall sensors are used in the position sensor system, usually a sine-cosine analysis is carried out, the amplitudes of the measurement signals detected in the position sensor system being divided out. At a first approximation, the position detection is accordingly independent of the measurement signal strength. The strength of the detected magnetic fields (measurement signals) is closely dependent upon the distance between the position sensor system and the armature. That means that the amplitudes of the detected signals vary according to the bearing-play-dependent radial position of the armature. It should be noted that, in the event of such bearing-play-dependent changes in the position of the armature relative to the position sensor system, not only the amplitude but also the shape and direction of the field lines is affected. This has the result that the measurement signals, despite their advantageous analysis in accordance with the sine-cosine method, can be distorted and can give rise to position errors.

The mounting of the armature in a linear plain bearing with corresponding radial bearing play has the result that tubular linear motors have to be provided with an additional bearing arrangement if large lateral forces occur or if a high degree of guidance accuracy is required. That additional bearing arrangement can be realised, in a similar way to flat linear motors, with the aid of profile rail guides, or what is known as an H-form double-rod guide means is used. In addition to the disadvantages of the additional costs, the larger mass being moved and the larger overall volume, the use of an additional bearing arrangement also has the fundamental disadvantage that it is an overdetermined bearing system. In practice this requires laborious alignment work and usually the use of compensating coupling elements between the armature, which is guided in the linear plain bearing, and the external additional bearing arrangement. One possible way of circumventing the problem of the overdetermined bearing arrangement lies in completely dispensing with the internal mounting of the armature. For that purpose the armature is guided on both sides by the external bearing arrangement. The diameter of the armature must be correspondingly smaller in order that the armature does not touch the stator in any operating state. Particularly in the case of long guides, however, this is not so easy to ensure, because the armature exhibits load-dependent inherent bending. Accordingly, it will be necessary to accept an even greater measurement error in the determination of the armature position with the aid of the position sensor system. In addition, the force of the motor is also reduced by the smaller diameter of the armature.

It is therefore evident from the previous remarks that the plain bearing arrangement used in tubular linear motors cannot exceed certain technical limits both in respect of mechanical load-bearing capacity and in respect of guidance accuracy. Although the use of additional guide systems (supplementary guides) makes it possible correspondingly to enlarge the range of use of tubular linear motors, it must be accepted that additional technical outlay and therefore additional costs are involved, the masses being moved are increased by the masses of the supplementary guide means, and the overall structural size of the linear drive is made substantially larger. In each case there remains the limitation that the armature, on account of the bearing play, is never located centrally (coaxially) in the centre of the stator tubing and this gives rise to additional loads on the bearings and to positional deviations.

EP-A-1 607 205 shows a drive device for an injection-moulding machine which comprises a linear motor having a linear ball bearing. In the drive device shown in EP-A-1 607 205, however, the permanent magnets are not arranged (internally) in the armature tube (on the inside) but externally on the armature tube. In addition, the armature tube therein must necessarily consist of a magnetic (magnetisable) material (for example iron) and cannot consist of a non-magnetic material, because the armature tube forms part of the magnetic yoke. This is technically completely incompatible with a design of a tubular linear motor in which the drive coils are arranged in the stator and the permanent magnets are arranged (internally) in the armature tube (on the inside) which extends through the (central) through-hole of the stator. In such a linear motor the armature tube must necessarily be non-magnetic, because otherwise the yoke of the magnetic field of the permanent magnets would be via the armature tube, which would lead to inoperability.

A problem of the present invention is therefore to avoid the disadvantages described above and to provide a drive device having a tubular linear motor with robust, high-precision guidance of the armature, but wherein the structural advantages of a tubular linear motor are not to be impaired.

This aim is achieved by the drive device according to the invention as specified by the features of the independent claim. Advantageous aspects of the drive device according to the invention are subject matter of the dependent claims.

The drive device according to the invention comprises at least one tubular linear motor which has a cylindrical armature and a tubular stator with a cylindrical magnetic yoke and a through-hole coaxial with the magnetic yoke, with electric drive coils being arranged in the magnetic yoke. The armature has a non-magnetic armature tube in which permanent magnets are arranged, extends coaxially through the through-hole and is mounted so as to be movable in its longitudinal direction relative to the stator. The drive device according to the invention comprises linear ball bearings, and the armature of the tubular linear motor is mounted in those linear ball bearings. This allows high-precision guidance of the armature virtually without radial bearing play.

The armature of the linear motor of the drive device according to the invention can be regarded as a high-precision armature shaft which has a diameter tolerance in the range of h7 to h6 in accordance with DIN EN ISO 286, and that high-precision armature shaft is mounted almost play-free radially in the linear ball bearings and guided axially by the stator of the linear motor.

In accordance with an advantageous aspect of the drive device according to the invention, the stator has a position sensor system for detecting the longitudinal position of the armature relative to the stator, and the armature is guided with the aid of the linear ball bearings at a fixed radial distance from the position sensor system. As a result, position measurement errors are reduced to a minimum.

In accordance with a further advantageous aspect of the drive device according to the invention, the armature tube is made from surface-hardened stainless steel, and its outer surface has been ground. As a result, the armature forms a high-precision armature shaft having a surface hardness of preferably at least 900 HV (Vickers hardness), which is especially suitable for guidance in linear ball bearings.

In accordance with a further advantageous aspect of the drive device according to the invention, the linear ball bearings have balls which are made from a non-magnetic material. As a result, the magnetic armature can be guided in the linear ball bearings without magnetic attraction forces acting on the balls of the linear ball bearings.

In accordance with a further advantageous aspect of the drive device according to the invention, the balls of the linear ball bearings are made from an austenitic steel and have a hardened surface. As austenitic steels there come into consideration, for example, steels having the material name in accordance with European Standard EN10027-2/in accordance with American Iron and Steel Institute AISI Standard 1.4301/AISI 304 (X5CrNi18-10), 1.4401/AISI 316 (X5CrNiMo17-12-2), 1.4404/AISI 316L (X2CrNiMo17-12-2), 1.4571/AISI 316Ti (X6CrNiMoTi17-12-2), and the balls have a hardened surface with a hardness (Vickers hardness) as specified above for the surface hardness of the armature tube (at least 900 HV). Such balls provide a very precise and stable mounting for the armature, and—since those steels are non-magnetic—no magnetic attraction forces act on the balls of the linear ball bearings.

Alternatively, in accordance with a further advantageous aspect of the drive device according to the invention, the balls of the linear ball bearings are made from a high-performance plastics such as PEEK (polyether ether ketone) or PPS (polyphenylene sulfide). In principle the high-performance plastics that come into consideration for use in the linear ball bearings must be sufficiently hard (load-bearing capacity), may permit virtually no absorption of liquid (corrosion resistance) and must be temperature-resistant (heating during operation). Such balls are likewise suitable for precision mounting of the armature and need either little lubrication or no lubrication at all, depending upon whether lubricants have already been added to them during manufacture. In addition, they are very easy to clean.

In accordance with a further advantageous aspect of the drive device according to the invention, the linear ball bearings have raceway plates which are made from a non-magnetic material. In particular, such raceway plates which, in accordance with a further advantageous aspect, are made from austenitic steel, have a hardened surface. As austenitic steels there come into consideration, for example, steels having the material name in accordance with European Standard EN10027-2/in accordance with American Iron and Steel Institute AISI Standard 1.4301/AISI 304 (X5CrNi18-10), 1.4401/AISI 316 (X5CrNiMo17-12-2), 1.4404/AISI 316L (X2CrNiMo17-12-2), 1.4571/AISI 316Ti (X6CrNiMoTi17-12-2), and the raceway plates have a hardened surface with a surface hardness (Vickers hardness) of at least 900 HV.

In accordance with a further advantageous aspect of the drive device according to the invention, the linear ball bearings are arranged in the stator or before and after the stator in the longitudinal direction. That is to say, the linear ball bearings are not part of the stator, but, for example, can be mounted on the respective longitudinal ends of the stator.

In accordance with a further advantageous aspect of the drive device according to the invention, the device has a supplementary guide means with a guide rod parallel to the armature of the tubular linear motor, which guide rod is mounted so as to be longitudinally movable in additional linear ball bearings (separate from the linear ball bearings for the armature) and is kinematically coupled to the armature. This further improves guidance accuracy and especially acts as an anti-rotation device.

In accordance with a further advantageous aspect of the drive device according to the invention, the device has two tubular linear motors arranged in parallel, the armatures of the two parallel tubular linear motors being kinematically coupled to one another. As a result, it is possible to achieve twice the drive force while the overall structural volume is the same as that of the design having supplementary guide means.

In accordance with a further advantageous aspect of the drive device according to the invention, the drive device comprises two tubular linear motors arranged in parallel, the armatures of the two parallel tubular linear motors being kinematically coupled to one another. However, only one of the two parallel tubular linear motors has a position sensor system for detecting the position of its armature relative to its stator. The drive coils of the two tubular linear motors are connected in parallel or in series and can be supplied with power by a single controller. As a result, there is a significant reduction in technical outlay and accordingly a saving in costs.

In accordance with a further advantageous aspect of the drive device according to the invention, the device has two collinearly arranged tubular linear motors, the armatures of the two collinearly arranged tubular linear motors being kinematically coupled to an actuator plate via articulatedly connected pivot arms.

In accordance with a further advantageous aspect of the drive device according to the invention, the device has two tubular linear motors arranged in parallel, the armatures of the two parallel tubular linear motors being kinematically coupled to an actuator plate via articulatedly connected pivot arms. Such embodiments are configured especially for parallel-kinematic applications, with no additional guide means being required.

In accordance with a further advantageous aspect of the drive device according to the invention, either some of the balls or all of the balls of the linear ball bearings or of the additional linear ball bearings are self-lubricating in that they are made from a high-performance plastics, especially from PEEK or PPS with addition of solid lubricants (such as, for example, graphite or polytetrafluoroethylene). Such balls need not be lubricated and can also be cleaned without any subsequent regreasing (relubrication) being required. In principle it would also be possible for some of the balls of the linear ball bearing to be made from austenitic steel and for other balls of the same linear ball bearing to be the mentioned self-lubricating balls, so that the lubrication of the linear ball bearing as a whole is assumed by the self-lubricating balls. For example, in such a linear ball bearing the balls can be arranged so that balls made of austenitic steel and self-lubricating balls are always arranged one after the other in alternating sequence. Other sequences are also possible, however.

Further advantageous aspects of the drive device according to the invention are apparent from the following description of exemplary embodiments of the drive device according to the invention with the aid of the drawing, wherein.

The following observations apply in respect of the description which follows: where, for the purpose of clarity of the drawings, reference symbols are included in a Figure but are not mentioned in the directly associated part of the description, reference should be made to the explanation of those reference symbols in the preceding or subsequent parts of the description. Conversely, to avoid overcomplication of the drawings, reference symbols that are less relevant for immediate understanding are not included in all Figures. In that case, reference should be made to the other Figures. The stator is to be understood as being that part of the motor in the magnet yoke of which electric drive coils are arranged and which supports those electric drive coils. Accordingly, the armature is to be understood as being that part of the motor in which permanent magnets are arranged. In principle it is immaterial whether the stator or the armature is assumed to be in fixed position during practical use of the linear motor.

FIGS. 1-3 and FIG. 6 show exemplary embodiments of the drive device according to the invention which each comprise only a single tubular linear motor. FIGS. 7-10 show exemplary embodiments having two tubular linear motors. It will be understood that the drive device according to the invention can also have more than two tubular linear motors.

Figure 1:
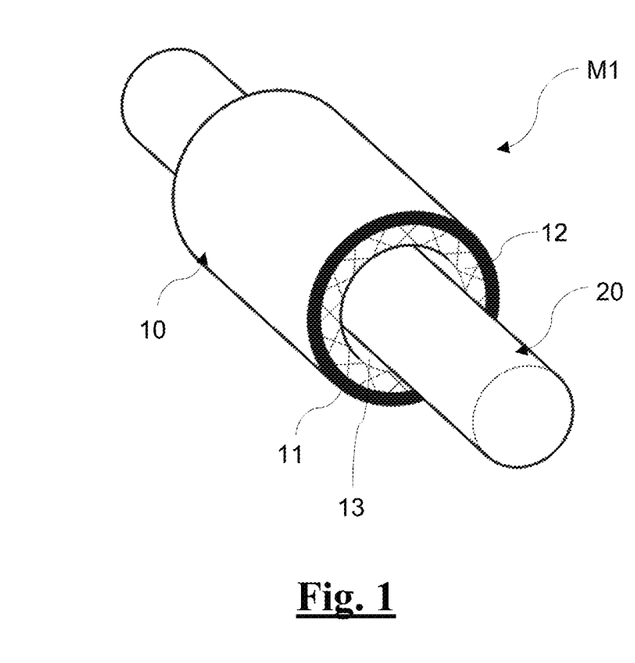
FIG. 1 shows a simplified perspective view of an exemplary embodiment of a tubular linear motor of a drive device according to the invention.

FIG. 1 shows a simplified perspective view of a tubular linear motor M1 of a drive device according to the invention having a tubular stator 10 and a permanent-magnet-excited armature 20. The stator 10 comprises a cylindrical yoke 11 made of iron, in which there are arranged drive coils 12 which can be supplied with power by a controller (not shown herein). The armature 20 extends through a through-hole 13 in the stator 10 and is mounted therein (by means of internal or external bearings) so as to be movable in a longitudinal direction.

Figure 2:
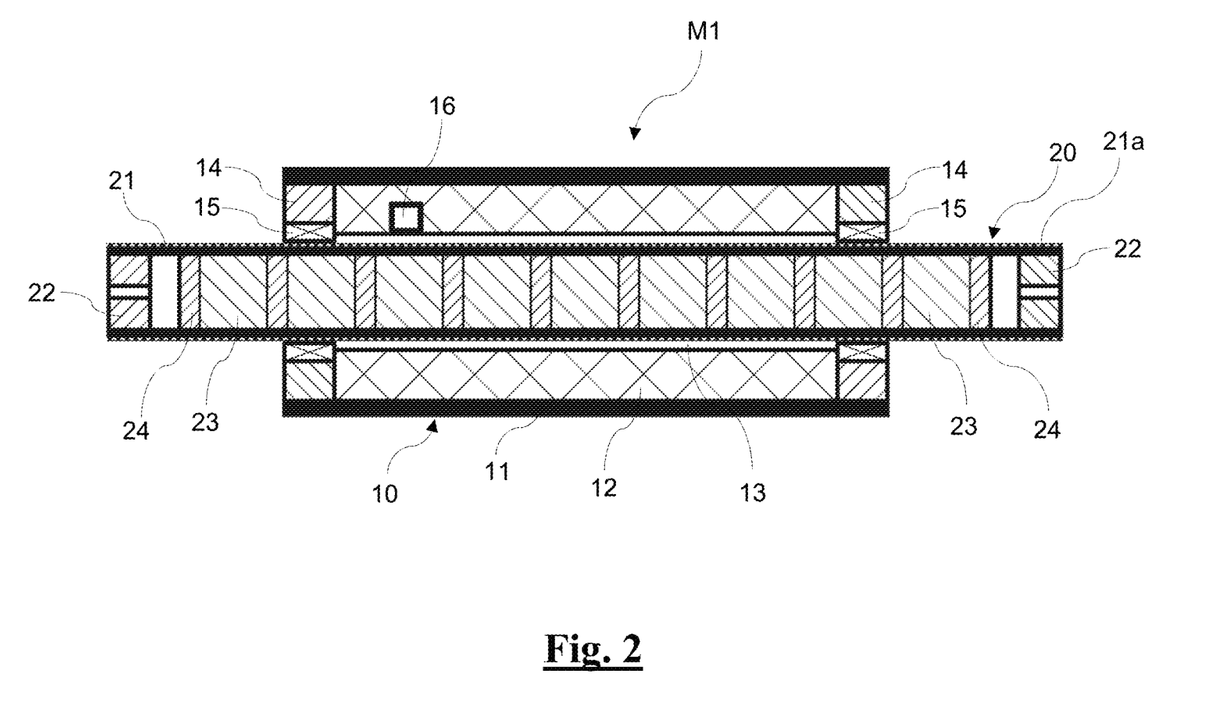
FIG. 2 shows an axial section through the tubular linear motor from FIG. 1.

FIG. 2 shows an axial section through the tubular linear motor M1 from FIG. 1. The stator 10 is closed at each longitudinal end by means of an annular end wall 14. A linear ball bearing 15, the structure of which will be described in detail hereinbelow, is mounted in each of the two annular end walls 14. Also shown is a diagrammatic view of a sensor system 16 for detecting the position of the armature 20 relative to the stator 10.

The armature 20 comprises an encasing armature tube 21 made of an austenitic and consequently non-ferromagnetic steel, for example made of a steel having the material name in accordance with European Standard EN10027-2/in accordance with American Iron and Steel Institute AISI Standard 1.4301/AISI 304 (X5CrNi18-10), 1.4401/AISI 316 (X5CrNiMo17-12-2), 1.4404/AISI 316L (X2CrNiMo17-12-2), 1.4571/AISI 316Ti (X6CrNiMoTi17-12-2). The armature tube 21 is closed at its two longitudinal ends by end parts 22, and has a hardened surface 21a (indicated by dashed lines). Permanent magnets 23 and iron discs or spacers 24 are arranged alternately inside the armature tube 21. The use of magnetic steel for the armature tube 21 would be equivalent to a magnetic short-circuiting of the permanent magnets 23 and is accordingly unsuitable. The armature tube 21 itself is a precision steel tube and has both a high-precision internal diameter and a high-precision external diameter (diameter tolerance in the range of h7 to h6 in accordance with DIN EN ISO 286). Since, during assembly of the armature 20, the permanent magnets 23 and the iron discs 24 or spacers have to be inserted into the armature tube 21, the diameter of the permanent magnets 23 and of the iron discs or spacers 24 must be smaller than the internal diameter of the armature tube 21. It must be ensured that with all tolerances it is still easily possible to insert the permanent magnets and iron discs or spacers 24 into the armature tube 21. Their insertion can nevertheless result in stress being exerted on the armature tube 21 as a result of the friction and possibly as a result of the parts tilting.

Figure 4:
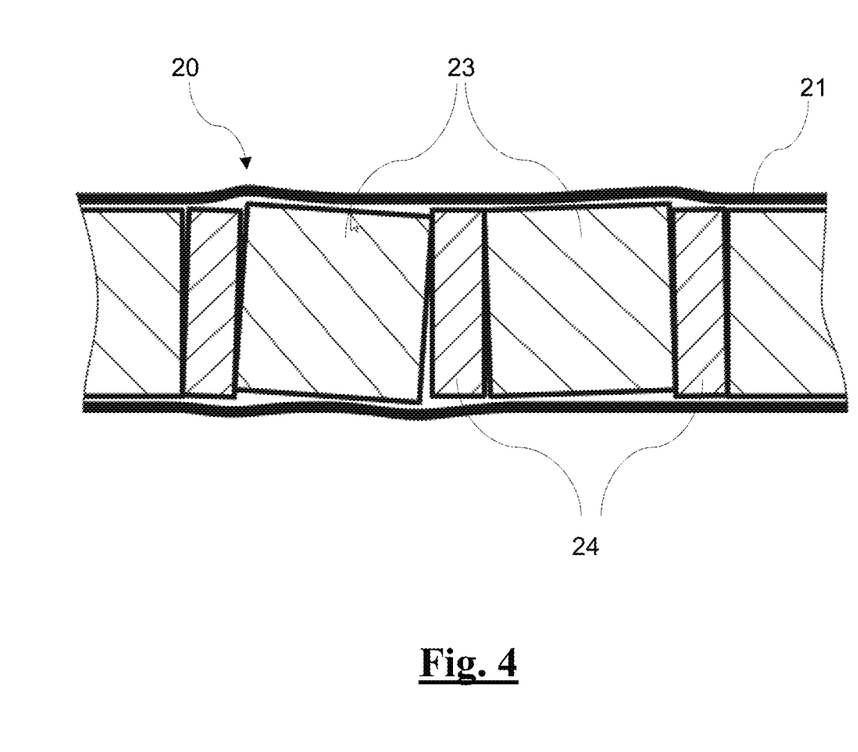
FIG. 4 shows a detail of an armature of a tubular linear motor with bulges of the armature tube shown exaggerated in the drawing.

As shown exaggerated in FIG. 4, in the case of conventional thin-walled armature tubes (wall thickness typically 0.5 mm) this can result in bulges in the armature tube, which can lie in the range of a few hundredths of a millimetre. Although regrinding of the finished thin-walled armature then brings about an improvement to the extent that those bulges are levelled out, true cylindrical grinding of the armature to a narrow tolerance window (such as the tolerance range of h7-h6 mentioned above) is not possible, especially on account of the small wall thickness of a conventional armature tube. This applies both to the case of a conventional armature tube 21 filled with permanent magnets 23 and iron discs or spacers 24 and to the case of an unfilled conventional armature tube 21. To achieve the high precision of the internal and external diameters of the armature tube of the drive device according to the invention, the armature of the drive device according to the invention is therefore manufactured in a special way which will be explained further hereinbelow.

The linear ball bearings 15 of the drive device according to the invention are of virtually play-free construction and support or guide the armature 20 centrally (exactly on the longitudinal axis/axis of symmetry). The main reason for the above-mentioned measurement signal distortion in determining the position of the armature is therefore addressed at its root cause. The very exact central guidance or position of the armature 20 substantially reduces the load exerted on the bearings by magnetic attraction forces and, by virtue of the exactly defined position of the armature 20, allows simple connection to other mechanical components.

Figure 3:
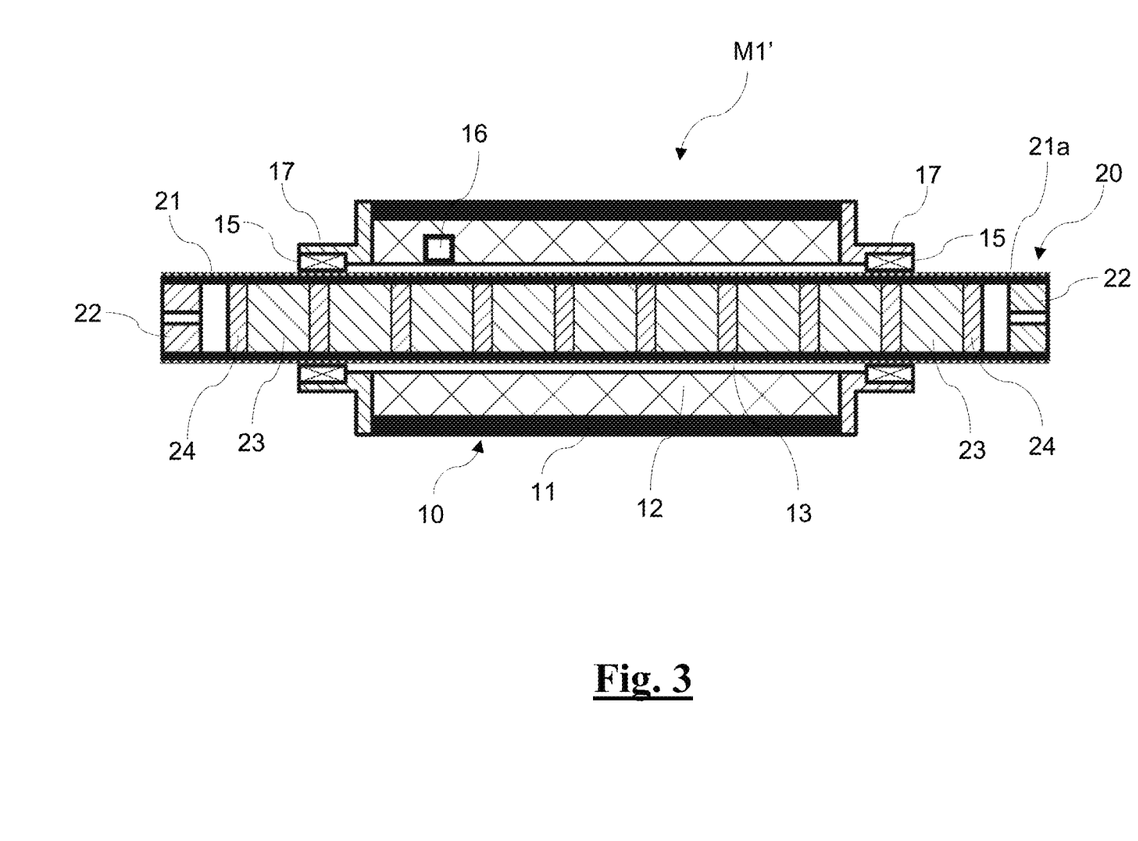
FIG. 3 shows an axial section through a variant of the tubular linear motor of a drive device according to the invention.

FIG. 3 shows an axial section through a variant of a tubular linear motor M1' of the drive device according to the invention. In comparison with the variant shown in FIG. 2, the difference lies in the arrangement of the linear ball bearings 15 in flanges 17 which are mounted on the stator 10, so that the linear ball bearings are arranged outside the stator 10 (before and after the stator 10, seen in the longitudinal direction).

In contrast to an arrangement with plain bearings which, due to the principle involved, exhibit bearing play, the armature 20 mounted in the linear ball bearings 15 is arranged virtually play-free radially and is located exactly in the centre of the through-hole 13. Accordingly, this eliminates the non-correctable error in the position detection by the Hall sensors that results from a radial displacement of the armature (non-centric arrangement of the armature). This is all the more significant because, in particular, changes in load give rise to such a radial displacement of the armature within the limits of the bearing play and accordingly a position detection error occurs precisely when the position controller needs to exert maximum control.

Figure 5:
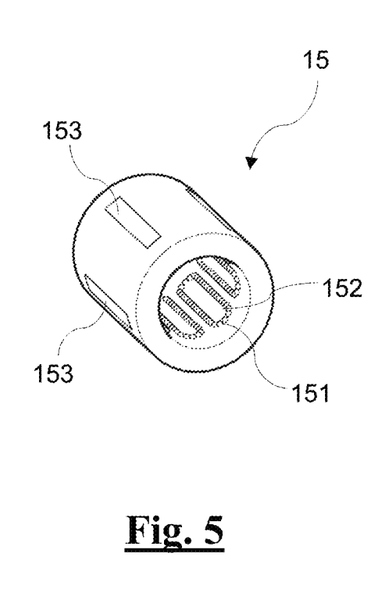
FIG. 5 shows a perspective view of a linear ball bearing.

FIG. 5 shows a diagrammatic view of the structure of a (known and commercially available) linear ball bearing 15. In the event of a linear movement of a shaft guided in the linear ball bearing, the balls 151 of the linear ball bearing 15 perform a "circular movement" in closed oval circulatory tracks 152. The balls 151 are supported by raceway plates 153 only on one of the two longitudinal tracks of the respective oval circulatory track 152. That is to say, the actual bearing function occurs only where the balls are supported by the raceway plates 153. In all other sub-regions of the respective oval circulatory tracks the balls 151 do not absorb any forces and in that respect move load-free along the respective oval circulatory track.

If a shaft mounted in such a conventional linear ball bearing is accelerated too quickly there is a considerable risk that the balls will not start to roll immediately but will slide on the outer surface of the shaft and on the raceway plates 153 and thus damage them, for which reason linear ball bearings have not been used hitherto in tubular linear motors. Moreover, in the case of linear ball bearings, the bearings are subject to point loads.

For that reason, in the drive device according to the invention the outer surface 21a of the armature tube 21 of the tubular linear motor has a sufficient surface hardness (at least 900 HV Vickers hardness), because otherwise the balls 151 can give rise to grooves or indentations. For example, the armature tube 21 is made from a surface-hardened steel and has been hardened. This applies similarly to the balls 151 and the raceway plates 153 of the linear ball bearing 15.

In addition, in the case of conventional "stainless" linear ball bearings, certain compromises are also made in other respects if the material used is steel of material class 1.40xx or 1.41xx (material name in accordance with European Standard EN10027-2), the designation "stainless" or "niro" (="<u>ni</u>cht <u>r</u>ostend"–"non-rusting") anyway being misleading: these materials on no account have satisfactory corrosion resistance with respect to aggressive cleaning agents, as are used inter alia in the food industry. In addition, the iron in those types of steel is ferromagnetic, so that it is attracted by magnetic fields and is therefore unsuitable for application in tubular linear motors for the reasons already mentioned.

That is to say, if the permanent-magnet-excited armature 20 of a tubular linear motor were to be used together with such a conventional linear ball bearing, the linear movement of the armature 20 would be virtually blocked. The magnetic attraction forces exerted by the permanent magnets 23 in the armature 20 would be so great that the balls 151 of the linear ball bearing 15 would be prevented from rolling and accordingly would act like a brake. Moreover, each linear displacement of the armature, if it were possible at all by application of corresponding force, would give rise to magnetic locking, because the ferromagnetic raceway plates 153 would act like a magnet yoke and so would react to the pole pitch of the permanent magnets in the armature.

As already mentioned hereinabove, the correct mode of operation of a linear ball bearing is based inter alia on high-precision manufacture of the mounted shaft (in the case of the present drive device according to the invention: the armature tube 21). In particular, the diameter and the roundness must have very close tolerances over the entire length of the shaft. In this case tolerances of the shaft in the range of accuracy class h7-h6 are usually required.

Armatures for conventional tubular linear motors having plain bearings typically comprise a thin-walled chromium steel tube (wall thickness about 0.5 mm) and permanent magnets which are arranged internally in that chromium steel tube. The external diameter of the tube is relatively inexact (diameter 20 mm±0.05 mm, uneven, non-round) and the surface is soft. This presents no problem in the case of plain bearings because they exhibit radial bearing play due to the principle involved. Such armatures cannot be mounted in linear ball bearings, however, because on the one hand their precision is too low and the surface is too soft, and on the other hand the armatures are magnetic and the balls of the linear ball bearings, if steel of material class 1.40xx or 1.41xx (material name in accordance with European Standard EN10027-2) were used, would be attracted thereby. The armatures of conventional tubular linear motors are therefore unsuitable for guidance in linear ball bearings.

As material for the armature 20 of the tubular linear motor of the drive device according to the invention there is therefore used a non-magnetic material, especially non-magnetic surface-hardened stainless steel, preferably an austenitic steel, for example a steel having the material name in accordance with European Standard EN10027-2/in accordance with American Iron and Steel Institute AISI Standard 1.4301/AISI 304 (X5CrNi18-10), 1.4401/AISI 316 (X5CrNiMo17-12-2), 1.4404/AISI 316L (X2CrNiMo17-12-2), 1.4571/AISI 316Ti (X6CrNiMoTi17-12-2). This material is used to produce (for example for a armature tube having an external diameter of 20 mm) a thick-walled tube (wall thickness, for example, 1 mm) with initially a slightly oversized external diameter (for example a few tenths of a millimetre oversize), but with a high-precision internal diameter (tolerance class h7-h6). The internal diameter corresponds exactly to that dimension which is necessary for the insertion of the permanent magnets 23 and the iron discs or spacers 24 (for example 16 mm at a wall thickness of 1 mm). The external dimension of the thick-walled tube can still be relatively inexact and must merely guarantee the oversize necessary for the subsequent grinding process. Because a rough tolerance in the region of a few tenths of a millimetre is sufficient for the external dimension, the process of manufacturing the thick-walled tube can advantageously be optimised in respect of the required small tolerance in internal diameter. The thick-walled tube is then ground down to the desired external dimension in the tolerance range h7-h6 of the armature tube 21. In order to have a sufficient hardness with respect to the balls 151 of the linear ball bearings 15, the outer surface of the finished ground armature tube 21 is then surface-hardened using a suitable process. That hardened outer surface 21a of the armature tube 21 can be seen in FIG. 2 and FIG. 3 (shown by dashed lines). For the surface-hardening there are suitable, for example, case nitriding processes (nitrocarburisation processes) with which a surface having Vickers hardnesses of more than 900 HV can be achieved. When selecting the (final) wall thickness of the armature of the drive device according to the invention, consideration should be given both to its suitability for the grinding process and to the desired flexural strength of the armature (bearing in mind the loading occurring during use) and, of course, the high drive force which is still desired.

Unlike the armature 20 or the armature tube 21 of the tubular linear motor of the drive device according to the invention, the armature or the armature tube of conventional tubular linear motors is usually optimised solely in respect of the magnetic circuit, whereas in the drive device according to the invention the armature 20 of the tubular linear motor is additionally optimised in respect of its manufacture and the resulting flexural strength. The grinding process plays an important role in its manufacture. A tube that is too thin-walled from the outset cannot be ground so as to be exactly round, because it is unable to absorb the mechanical pressure of the grinding process, and the heat thereby generated, without being damaged. Similarly, a tube having too low a flexural strength will, under load, lose the straightness required for linear ball bearings (in the longitudinal direction), i.e. it will be bent too much. It is, of course, necessary also to take into account the desired length of the portion of the armature projecting from the stator and the loading at the end of the armature. From the magnetic viewpoint, however, a tube that is as thin-walled as possible remains an objective in order that a low magnetic resistance is obtained, i.e. the permanent magnets come as close as possible to the coils in the stator (drive force).

In order then to mount such an armature 20 in linear ball bearings 15, the balls 151 of the linear ball bearing 15 are made from a non-magnetic material. The same applies to the raceway plates 153 and any further components which are used in the linear ball bearing. For example, the balls 151 and the raceway plates 153 can be made from a non-magnetic and preferably surface-hardened stainless steel, such as, for example, from an austenitic steel, for example a steel having the material name in accordance with European Standard EN10027-2/in accordance with American Iron and Steel Institute AISI Standard 1.4301/AISI 304 (X5CrNi18-10), 1.4401/AISI 316 (X5CrNiMo17-12-2), 1.4404/AISI 316L (X2CrNiMo17-12-2), 1.4571/AISI 316Ti (X6CrNiMoTi17-12-2).

Alternatively, the balls 151 can also be made from a high-performance plastics such as PEEK (polyether ether ketone) or PPS (polyphenylene sulfide). In particular, such balls 151 can be made from a high-performance plastics with addition of solid lubricants (such as, for example, graphite or polytetrafluoroethylene) and can accordingly be self-lubricating. Such balls need not be lubricated. Linear ball bearings equipped with such balls can be cleaned as desired without needing subsequent regreasing. A further advantage of self-lubricating plastics balls in linear ball bearings for use with tubular linear motors is that they exhibit improved behaviour in the borderline acceleration range. As already explained, conventional linear ball bearings have a limitation insofar as the balls of the linear ball bearing need to roll and may not be allowed to begin to slide. Otherwise, in the event of too great an acceleration, the contact surface between the metal balls and the guided armature tube will be damaged. In the case of self-lubricating plastics balls, in principle the same effect (sliding of the balls instead of rolling) occurs in the boundary region but, when sliding occurs, the self-lubricating properties of the balls have the result that at a first approximation a (plastics) plain bearing is formed and the risk of damage to the balls and armature tube is significantly lower. Linear ball bearings having combinations of stainless steel balls and such plastics balls are also possible in principle, in which case the ball types can be arranged in alternating sequence, but may also vary therefrom.

In the case of the drive device according to the invention having the tubular linear motor and linear ball bearings, the armature is able to absorb significantly higher lateral forces than the armature of a conventional tubular linear motor having a plain bearing. In many cases it is therefore possible to do without a supplementary guide means.

Figure 6:
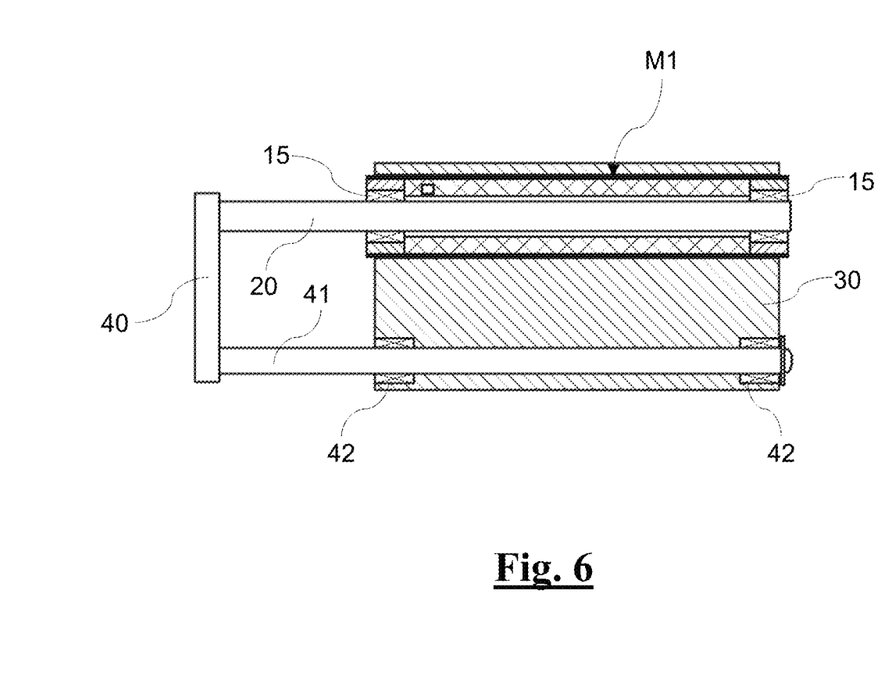
FIG. 6 shows a diagrammatic view of an exemplary embodiment of the drive device according to the invention with a tubular linear motor as part of an H-guide means.

FIG. 6 shows a diagrammatic view of an exemplary embodiment of the drive device according to the invention having a tubular linear motor M1 with a supplementary guide means. The tubular linear motor M1 is installed in a frame 30 and its armature 20 is guided in linear ball bearings 15. In the frame 30 there are arranged two additional linear ball bearings 42 (which are separate from the linear ball bearings 15 for the armature 20 of the linear motor) in which a guide rod 41 is guided so as to be longitudinally movable. The guide rod 41 and the armature 20 are connected to one another via a front plate 40 (kinematic coupling). A compensating coupling, as is required for conventional drive devices in which the armature of the tubular linear motor is guided in linear plain bearings, is unnecessary in this case, and so assembly is very much simpler.

Figure 7:
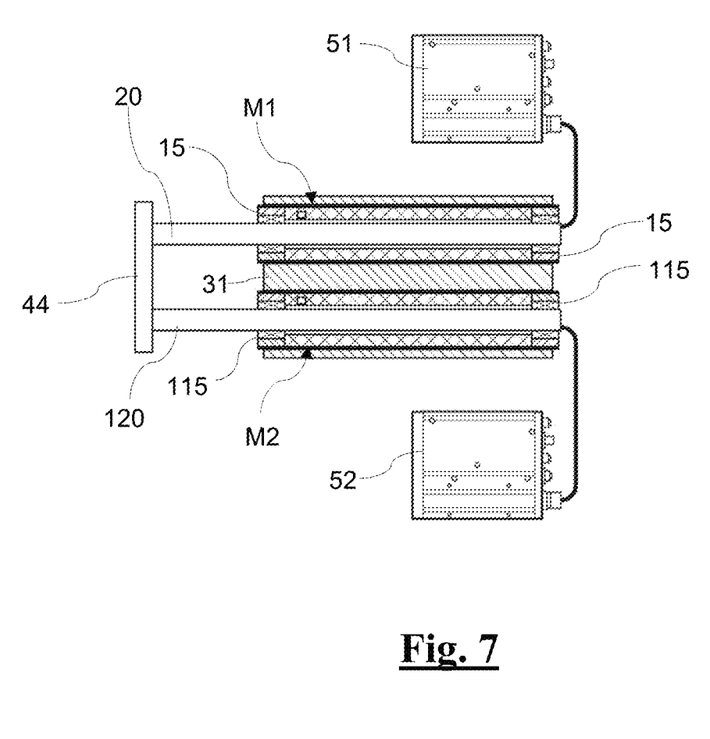
FIG. 7 shows a diagrammatic view of an exemplary embodiment of a drive device according to the invention in the form of an H-guide means, with two tubular linear motors, each linear motor having its own controller.

FIG. 7 shows a further exemplary embodiment of the drive device according to the invention having two tubular linear motors M1 and M2 of the same type installed in a frame 31, the armatures 20, 120 of which are mounted in linear ball bearings 15, 115, respectively. The two armatures 20 and 120 are connected to one another (kinematically coupled) via a front plate 44. This exemplary embodiment is similar to that from FIG. 6, but the guide rod 41 of the exemplary embodiment from FIG. 6 with its associated bearing arrangement has been replaced by the second tubular linear motor M2. This is possible because the armature 120 has comparable properties to the guide rod 41 and is likewise guided in linear ball bearings 115. Accordingly, the mass being moved is reduced and the structure of the guide means becomes considerably simpler. Furthermore, it is therewith possible to achieve twice the drive force in comparison with the exemplary embodiment from FIG. 6, while the structural size is the same. Moreover, in the exemplary embodiment in FIG. 7 two controllers 51, 52 (for example servo controllers) are provided, each of which actuates (supplies power to) a respective one of the two tubular linear motors M1 and M2.

Figure 8:
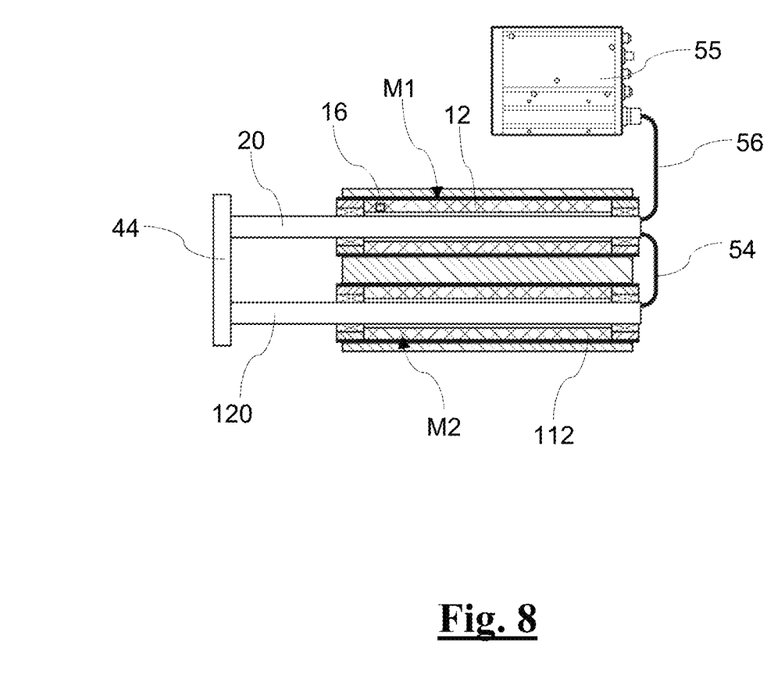
FIG. 8 shows a diagrammatic view of a further exemplary embodiment of a drive device according to the invention in the form of an H-guide means, with a tubular linear motor and a simplified linear motor connected in parallel therewith, only one linear motor having a controller.

FIG. 8 shows a further exemplary embodiment of the drive device according to the invention having two tubular linear motors M1 and M2 in the form of an H-guide means. This exemplary embodiment is similar to the exemplary embodiment from FIG. 7, but unlike the exemplary embodiment from FIG. 7 the second tubular linear motor M2 does not include a position sensor system 16; its stator comprises solely coils, an iron yoke and linear ball bearings. By virtue of the parallel arrangement of the two linear motors M1 and M2, the drive coils 112 of the linear motor M2 can be connected by a connecting cable 54 in parallel or in series with the drive coils 12 of the first linear motor M1. From the viewpoint of actuation (supply of power to the drive coils), this is a solution which consists of just a single linear motor, the drive coils of which are distributed between two stators. Accordingly, only a single controller 55 (for example a servo controller) and only one connecting cable 56 are required for actuation, which significantly reduces the technical outlay and accordingly the costs.

Figure 9:
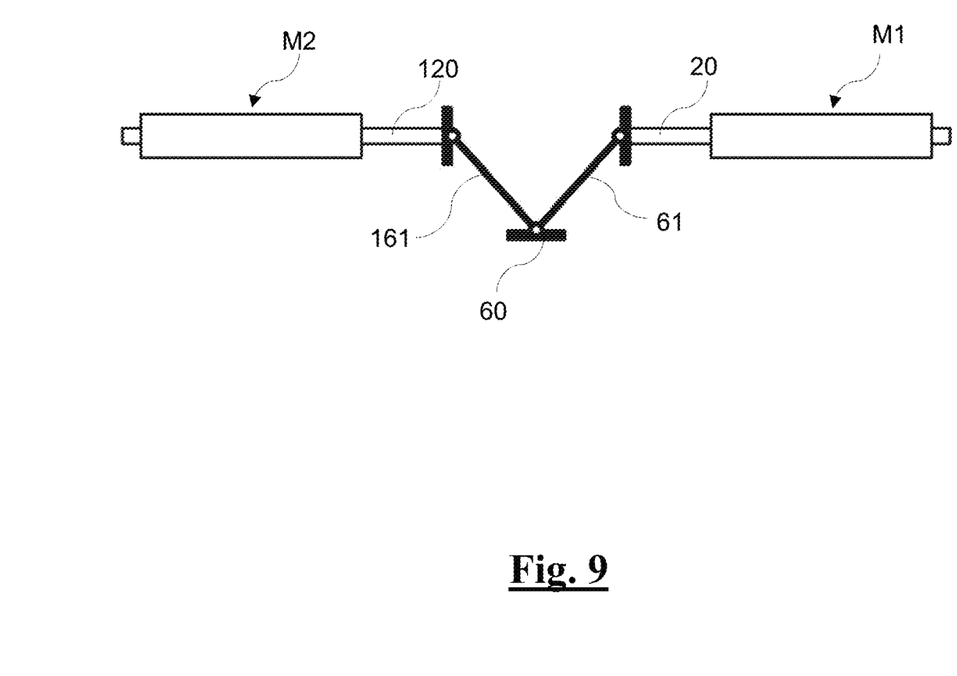
FIG. 9 shows a diagrammatic view of a further exemplary embodiment of a drive device according to the invention with two tubular linear motors in a simple parallel-kinematic configuration.
Figure 10:
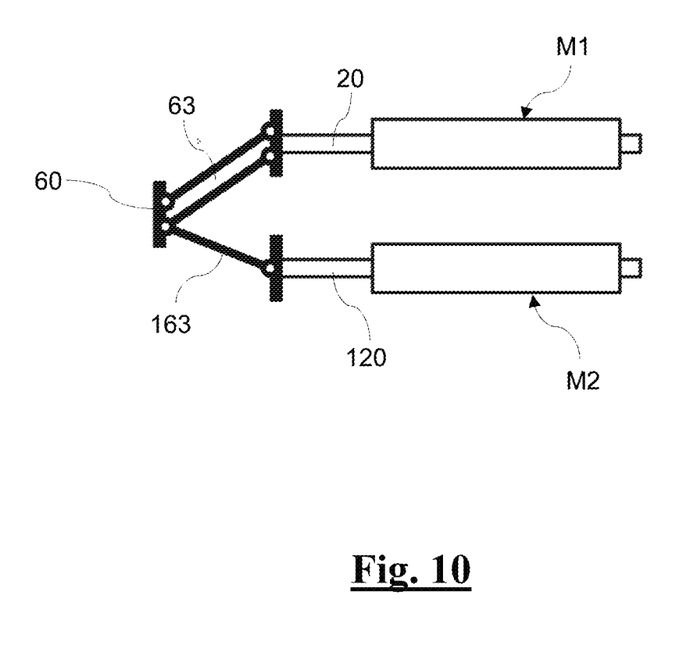
FIG. 10 shows a further exemplary embodiment of a drive device according to the invention with two tubular linear motors in a different simple parallel-kinematic configuration.

FIG. 9 and FIG. 10 show two further exemplary embodiments of the drive device according to the invention, in each of which two tubular linear motors M1 and M2 having linear ball bearings are configured for a parallel-kinematic application, with no additional guide means being required.

In FIG. 9 the two linear motors M1 and M2 are arranged collinearly and their armatures 20, 120 act on an actuator plate 60 via articulatedly connected pivot arms 61, 161. In FIG. 10 the two linear motors M1 and M2 are arranged parallel to one another and their armatures 20, 120 act on an actuator plate 60 via articulatedly connected pivot arms 63, 163. All forms of what are known as hexapods can also be realised in an analogous way.

The invention claimed is:

1. A drive device comprising:
at least one tubular linear motor which has a cylindrical armature and a tubular stator with a cylindrical magnetic yoke and a through-hole coaxial with the magnetic yoke,
wherein electric drive coils are arranged in the magnetic yoke,
wherein the armature comprises a continuous non-magnetic armature tube in which a plurality of permanent magnets are arranged,
wherein the continuous non-magnetic armature tube extends coaxially through the through-hole projecting further from the stator and is mounted so as to be movable in its longitudinal direction relative to the stator,
wherein the drive device comprises linear ball bearings, each linear ball bearing comprising a tubular housing and balls distributed along an axial direction of the tubular housing, wherein the tubular housing is configured to facilitate ball circulation along the axial direction, and
wherein the non-magnetic armature tube is mounted in the linear ball bearings and in contact with the balls of the linear ball bearings.

2. The drive device according to claim 1, wherein the stator has a position sensor system for detecting the longitudinal position of the armature relative to the stator, and wherein the armature is guided with aid of the linear ball bearings at a fixed radial distance from the position sensor system.

3. The drive device according to claim 1, wherein the armature tube is made from surface-hardened stainless steel, and wherein its outer surface has been ground.

4. The drive device according to claim 1, wherein the linear ball bearings have balls which are made from a non-magnetic material.

5. The drive device according to claim 4, wherein the balls of the linear ball bearings are made from an austenitic steel and have a hardened surface.

6. The drive device according to claim 4, wherein the balls of the linear ball bearings are made from a high-performance plastic.

7. The drive device according to claim 6, wherein the high-performance plastic is polyether ether ketone (PEEK) or polyphenylene sulfide (PPS).

8. The drive device according to claim 1, wherein the linear ball bearings have raceway plates which are made from a non-magnetic material.

9. The drive device according to claim 8, wherein the raceway plates of the linear ball bearings are made from an austenitic steel and have a hardened surface.

10. The drive device according to claim 1, wherein the linear ball bearings are arranged in the stator or before and after the stator in the longitudinal direction of the stator.

11. The drive device according to claim 1, which has two collinearly arranged tubular linear motors, the armatures of the two collinearly arranged tubular linear motors being kinematically coupled to an actuator plate via articulatedly connected pivot arms.

12. The drive device according to claim 1, which has two tubular linear motors arranged in parallel, the armatures of the two parallel tubular linear motors being kinematically coupled to an actuator plate via articulatedly connected pivot arms.

13. A drive device comprising:
at least one tubular linear motor which has a cylindrical armature and a tubular stator with a cylindrical magnetic yoke and a through-hole coaxial with the magnetic yoke,
wherein electric drive coils are arranged in the magnetic yoke,
wherein the armature has a non-magnetic armature tube in which permanent magnets are arranged, and wherein the armature extends coaxially through the through-hole and is mounted so as to be movable in its longitudinal direction relative to the stator, wherein the drive device comprises linear ball bearings, wherein the armature of the tubular linear motor is mounted in the linear ball bearings, and wherein the drive device comprises a supplementary guide means with a guide rod parallel to the armature of the tubular linear motor, which guide rod is mounted so as to be longitudinally movable in additional linear ball bearings and is kinematically coupled to the armature of the tubular linear motor.

14. The drive device according to claim 13, wherein either some of the balls or all of the balls of the linear ball bearings or of the additional linear ball bearings are of self-lubricating construction in that they are made from a high-performance plastic, with addition of solid lubricants.

15. The drive device according to claim 14, wherein the high-performance plastic is polyether ether ketone (PEEK) or polyphenylene sulfide (PPS).

16. A drive device comprising:

at least one tubular linear motor which has a cylindrical armature and a tubular stator with a cylindrical magnetic yoke and a through-hole coaxial with the magnetic yoke, wherein electric drive coils are arranged in the magnetic yoke, wherein the armature has a non-magnetic armature tube in which permanent magnets are arranged, and wherein the armature extends coaxially through the through-hole and is mounted so as to be movable in its longitudinal direction relative to the stator, wherein the drive device comprises linear ball bearings, wherein the armature of the tubular linear motor is mounted in the linear ball bearings, and wherein the drive device comprises two tubular linear motors arranged in parallel, the armatures of the two parallel tubular linear motors being kinematically coupled to one another.

17. The drive device of claim 16, wherein only one of the two parallel tubular linear motors has a position sensor system for detecting a position of its armature relative to its stator, and wherein the drive coils of the two tubular linear motors are connected in parallel or in series and can be supplied with power by a single controller.

* * * * *